(12) United States Patent
Stehlik et al.

(10) Patent No.: US 11,868,847 B2
(45) Date of Patent: Jan. 9, 2024

(54) MITIGATING CROSS-TALK IN A FLUX TUNABLE COUPLER ARCHITECTURE

(71) Applicant: INTERNATIONAL BUSINESS MACHINES CORPORATION, Armonk, NY (US)

(72) Inventors: Jiri Stehlik, New York, NY (US); David Zajac, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 487 days.

(21) Appl. No.: 17/203,691

(22) Filed: Mar. 16, 2021

(65) Prior Publication Data

US 2022/0300844 A1 Sep. 22, 2022

(51) Int. Cl.
*G06N 10/00* (2022.01)
*H04B 10/70* (2013.01)

(52) U.S. Cl.
CPC ............ *G06N 10/00* (2019.01); *H04B 10/70* (2013.01)

(58) Field of Classification Search
CPC ................................ G06N 10/00; H04B 10/70
USPC ........................................................... 257/31
See application file for complete search history.

(56) References Cited

U.S. PATENT DOCUMENTS

| 10,262,276 | B2 | 4/2019 | Puri | |
|---|---|---|---|---|
| 10,452,991 | B1* | 10/2019 | Ganzhorn | B82Y 10/00 |
| 10,643,143 | B2 | 5/2020 | Bloom | |
| 2017/0193388 | A1* | 7/2017 | Filipp | G06F 15/82 |
| 2018/0225586 | A1 | 8/2018 | Chow | |
| 2019/0391214 | A1* | 12/2019 | Ferguson | H10N 69/00 |
| 2020/0204181 | A1 | 6/2020 | Sete | |
| 2022/0059919 | A1* | 2/2022 | Underwood | H01P 5/16 |
| 2022/0198310 | A1* | 6/2022 | Mueller | G01R 33/035 |

OTHER PUBLICATIONS

Chen, Z, et al, "Exponential suppression of bit or phase flip errors with repetitive error correction"; Quantum Physics, arXiv:2102.06132v1 [quant-ph] (2021); 32 pgs.

Garcia-Ripoll, J. et al, "Quantum control of frequency tunable transmon superconducting qubits"; Phys. Rev. Applied (2020); vol. 14: 044035; arXiv:2002.10320v3 [quant-ph]; 11 pgs.

McKay, D. et al, "Efficient Z-Gates for Quantum Computing"; Phys. Rev. Applied (2017); vol. 96:022330; arXiv:1612.00858v2 [quant-ph]; 8 pgs.

Tomita, Y. et al, "Multi-qubit compensation sequences", New J. Phys. (2020); vol. 12:015002; 14 pgs.

Yan, F. et al, "A tunable coupling scheme for implementing high-fidelity two-qubit gates"; Phys. Rev. Applied (2018); vol. 10:054062; arXiv:1803.09813v1 [quant-ph]; 10 pgs.

(Continued)

*Primary Examiner* — Igwe U Anya
(74) *Attorney, Agent, or Firm* — Intelletek Law Group, PLLC; Gabriel Daniel, Esq.

(57) ABSTRACT

A method of reducing stray coupling in a qubit array, includes turning ON a first coupler between a first qubit and second qubit of the qubit array by providing a pulse having a first amplitude to the first coupler. A stray coupling between the first coupler and a spectator qubit is reduced by turning ON a second coupler coupled to the spectator qubit, by providing a compensation pulse having a second amplitude, to the second coupler, based on the pulse having the first amplitude.

20 Claims, 10 Drawing Sheets

(56) References Cited

OTHER PUBLICATIONS

Stehlik, J. et al., "Tunable Coupling Architecture for Fixed-Frequency Transmons"; arxiv.org (2021); 7 pgs.
Sete, E. et al., "Floating Tunable Coupler for Scalable Quantum Computing Architectures"; arxiv.org (2021); 11 pgs.
Tianqi, C. et al., "Perturbation Impact of Spectators and Spurious Qubit Interactions on a Cross-Resonance Gate in a Tunable Coupling Superconducting Circuit"; arxiv.org (2021); 9 pgs.
Zajac, D. M. et at., "Spectator Errors in Tunable Coupling Architectures"; arxiv.org (2021); 5 pgs.
International Search Report and Written Opinion dated Jul. 4, 2022 in related international patent application No. PCT/EP2022/056599, 17 pgs.

\* cited by examiner

МITIGATING CROSS-TALK IN A FLUX TUNABLE COUPLER ARCHITECTURE

BACKGROUND

Technical Field

The present disclosure generally relates to superconducting devices, and more particularly, to qubit control.

Description of the Related Art

Superconducting quantum computing is an implementation of a quantum computer in superconducting electronic circuits. Quantum computation studies the application of quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate is a generalization of a logic gate. A quantum gate is a quantum circuit operating on a small number of qubits, which are building blocks of larger quantum circuits, like classical logic gates in conventional digital circuits. However, the quantum gate describes the transformation that one or more qubits will experience after the gate is applied on them, given their initial state. Various quantum phenomena, such as superposition and entanglement, do not have analogs in the world of classical computing and therefore may involve special structures, techniques, and materials.

SUMMARY

According to various embodiments, a method, system, and computing device are provided for mitigating stray coupling in a qubit array. A first coupler between a first qubit and second qubit of the qubit array is turned ON by providing a pulse having a first amplitude, to the first coupler. A stray coupling between the first coupler and a spectator qubit is reduced, e.g., canceled by turning ON a second coupler coupled to the spectator qubit, by providing a compensation pulse having a second amplitude, to the second coupler, based on the pulse having the first amplitude. By virtue of the compensation pulse provided to the second coupler, an adverse interaction with the spectator qubit is avoided during the formation of a gate between the first qubit and the second qubit.

In one embodiment, each of the first and second couplers is flux tunable.

In one embodiment, turning ON the first coupler between the first qubit and the second qubit creates a gate between the first qubit and the second qubit. The reduction of the stray coupling between the first coupler and the spectator qubit is operative to prevent an accidental gate between the first qubit and the spectator qubit.

In one embodiment, a width of the compensation pulse is substantially similar to a width of the pulse that is used to turn ON the first coupler.

In one embodiment, an amplitude of the compensation pulse is lower than an amplitude of the pulse that is used to turn ON the first coupler.

In one embodiment, the second coupler is turned ON by the compensation pulse when a frequency of the first qubit is substantially similar to a frequency of the spectator qubit, during a first edge (e.g., rising edge) of the pulse used to turn ON the first coupler.

In one embodiment, the second coupler is turned OFF by the compensation pulse when the frequency of the first qubit is substantially similar to the frequency of the spectator qubit, during a second edge (e.g., falling edge) of the pulse used to turn OFF the first coupler.

In one embodiment, the second coupler is turned OFF by the compensation pulse when the frequency of the first qubit is not substantially similar to the frequency of the spectator qubit, during the first edge of the pulse used to turn ON the first coupler.

In one embodiment, the second coupler is turned ON by the compensation pulse when the frequency of the first qubit is substantially similar to the frequency of the spectator qubit, during the second edge of the pulse used to turn OFF the first coupler.

In one embodiment, a collision between the second qubit and the spectator qubit is prevented by turning ON or keeping ON the second coupler by the compensation pulse when a frequency of the second qubit is substantially similar to the frequency of the spectator qubit.

In one embodiment, an amplitude of the compensation pulse, when the frequency of the first qubit is substantially similar to the frequency of the spectator qubit, is different from an amplitude of the compensation pulse when the frequency of the second qubit is substantially similar to the frequency of the spectator qubit.

In one embodiment, an amplitude of the compensation pulse is determined by, during a setup phase: applying a series of N pulses to the first coupler; for each of the N pulses, sweeping an amplitude of the compensation signal; and selecting an amplitude of the compensation signal that provides a least amount of stray coupling between the first coupler and the spectator qubit.

In one embodiment, a wait time or Z rotation between each of the N pulses is adjusted based on a highest constructive interference between two compensation pulses.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In discussing the present technology, it may be helpful to describe various salient terms. As used herein a qubit represents a quantum bit and a quantum gate is an operation performed on a qubit, such as controlling the super-positioning between two qubits.

As used herein, the term C-phase relates to a controlled phase gate, where a Z rotation of one qubit is defined by the state of another qubit. A ZZ refers to a state dependent qubit interaction that can be used to form a C-phase gate.

As used herein, the term flux-tunable relates to a device whose frequency depends on magnetic flux.

As used herein, a transmon is type of superconducting qubit, in which the charging energy Ec is much smaller than the Josephson energy Ej.

As used herein, a driveline relates to a qubit control line that carries signals to the qubit.

As used herein, the term degenerate relates to a quantum mechanics energy level that corresponds to two or more different measurable states of a quantum system. Conversely, two or more different states of a quantum mechanical system are said to be degenerate if they give the same value energy upon measurement.

Although the terms first, second, third, etc., may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Example embodiments are described herein with reference to schematic illustrations of idealized or simplified embodiments (and intermediate structures). As such, variations from the shapes of the illustrations as a result, for example, of manufacturing techniques and/or tolerances, may be expected. Thus, the regions illustrated in the figures are schematic in nature and their shapes do not necessarily illustrate the actual shape of a region of a device and do not limit the scope.

It is to be understood that other embodiments may be used and structural or logical changes may be made without departing from the spirit and scope defined by the claims. The description of the embodiments is not limiting. In particular, elements of the embodiments described hereinafter may be combined with elements of different embodiments.

As used herein, certain terms are used indicating what may be considered an idealized behavior, such as "lossless," "superconductor," "superconducting," "absolute zero," which are intended to cover functionality that may not be exactly ideal but is within acceptable margins for a given application. For example, a certain level of loss or tolerance may be acceptable such that the resulting materials and structures may still be referred to by these "idealized" terms.

The present disclosure generally relates to superconducting devices, and more particularly, to improving integrity of qubits by mitigating stray coupling from dominant qubits that affect spectator qubits during formation of gates. The electromagnetic energy associated with a qubit can be stored in so-called Josephson junctions and in the capacitive and inductive elements that are used to form the qubit. In one example, to read out the qubit state, a microwave signal is applied to the microwave readout cavity that couples to the qubit at the cavity frequency. The transmitted (or reflected) microwave signal goes through multiple thermal isolation stages and low-noise amplifiers that are used to block or reduce the noise and improve the signal-to-noise ratio. Alternatively, or in addition, a microwave signal (e.g., pulse) can be used to entangle one or more qubits. Much of the process is performed in a cold environment (e.g., in a cryogenic chamber), while the microwave signal of a qubit is ultimately measured at room temperature. The amplitude and/or phase of the returned/output microwave signal carries information about the qubit state, such as whether the qubit has dephased to the ground or excited state. The microwave signal carrying the quantum information about the qubit state is usually weak (e.g., on the order of a few microwave photons).

To measure this weak signal with room temperature electronics (i.e., outside the refrigerated environment), low-noise quantum-limited amplifiers (QLAs), such as Josephson amplifiers and travelling-wave parametric amplifiers (TWPAs), may be used as preamplifiers (i.e., first amplification stage) at the output of the quantum system to boost the quantum signal, while adding the minimum amount of noise as dictated by quantum mechanics, in order to improve the signal to noise ratio of the output chain. In addition to Josephson amplifiers, certain Josephson microwave components that use Josephson amplifiers or Josephson mixers such as Josephson circulators, Josephson isolators, and Josephson mixers can be used in scalable quantum processors.

The ability to include more qubits is salient to being able to realize the potential of quantum computers. Generally, performance increases as temperature is lowered, for example by reducing the residual thermally-excited state qubit population and decreasing the thermal broadening of the qubit transition frequencies. Accordingly, the lower the temperature, the better for a quantum processor. Further, the cross-talk between an active qubit, sometimes referred to herein as a dominant qubit, with adjacent circuitry, such as a coupler resonator of an adjacent qubit, can increase the error rate. In general, there are two main sources of gate errors, namely decoherence (stochastic) and non-ideal interactions (deterministic). The latter includes parasitic coupling, leakage to non-computational states, and control crosstalk. For example, the next-nearest neighbor (NNN) coupling is a phenomenon that is spurious and introduces unwanted interactions between qubits that are meant to be unconnected, which is discussed in more detail below. NNN as well as any other qubit in the qubit array that may be affected by stray capacitance during the formation of a gate is collectively referred to herein as a spectator qubit.

Applicants have recognized that to increase the computational power and reliability of a quantum computer, improvements are needed along two main dimensions. First, is the qubit count itself. The more qubits in a quantum processor, the more states can in principle be manipulated and stored. Second is low error rates, which is relevant to manipulate qubit states accurately and perform sequential operations that provide consistent results and not merely unreliable data. Thus, to improve fault tolerance of a quantum computer, a large number of physical qubits should be used to store a logical quantum bit. In this way, the local information is delocalized such that the quantum computer is less susceptible to local errors and the performance of measurements in the qubits' eigenbasis, similar to parity checks of classical computers, thereby advancing to a more fault tolerant quantum bit. Having one or more spectator qubits in the proximity of active qubits may exacerbate stray coupling concerns.

In one aspect, the teachings herein are based on Applicants' insight that directly applying conventional integrated circuit techniques for interacting with computing elements to superconducting quantum circuits may not be effective because of the unique challenges presented by quantum circuits that are not presented in classical computing architectures. Accordingly, embodiments of the present disclosure are further based on recognition that issues unique to quantum circuits have been taken into consideration when evaluating applicability of conventional integrated circuit techniques to building superconducting quantum circuits, and, in particular, to electing methods and architectures used for interacting efficiently with qubits.

Example Architecture

Figure 1:
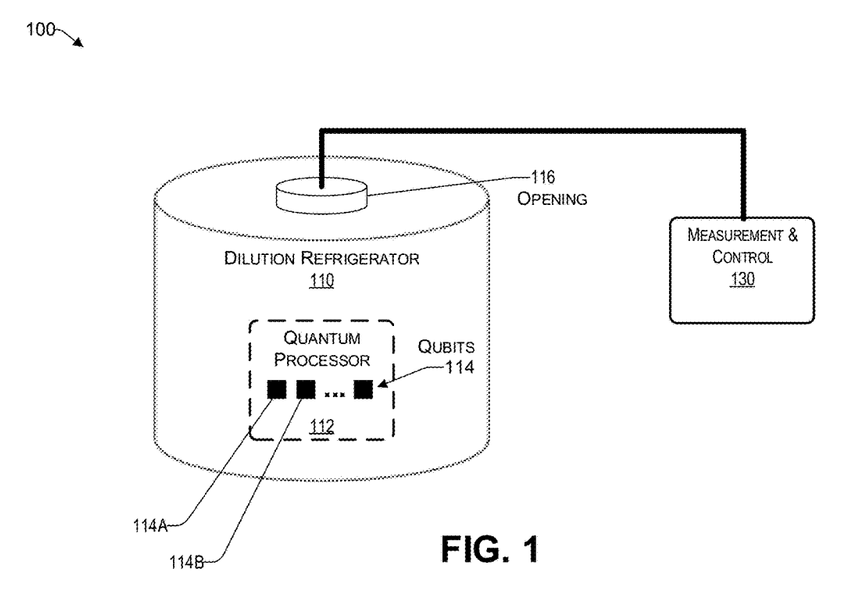
FIG. 1 is an example architecture of a quantum computing system, consistent with an illustrative embodiment.

FIG. 1 is an example architecture 100 of a quantum computing system, consistent with an illustrative embodiment. The architecture 100 includes a quantum processor 112 comprising a plurality of qubits 114. The quantum processor 112 is located in a refrigeration unit 110, which may be a dilution refrigerator. A dilution refrigerator is a cryogenic device that provides continuous cooling to temperatures typically 10 mK. Most of the physical volume of the architecture 100 is due to the large size of the refrigeration unit 110. To reach the near-absolute zero temperatures at which the system operates, the refrigeration unit 110 may us liquid helium as a coolant.

There is a measurement and control unit 130 that is outside of the refrigeration unit 110. The measurement and control unit 130 is able to communicate with the quantum processor through an opening 116, sometimes referred to as a bulkhead of the dilution refrigerator 110, which also forms a hermetic seal separating the ambient atmospheric pressure from the vacuum pressure of the cryostat under operation.

The plurality of qubits 114 may interact with one another. For example, a gate between qubits 114A and 114B, sometimes referred to herein as nearest neighbors (NN) can be formed. However, stray coupling between a dominant qubit (e.g., 114A) and spectator (e.g. 114B) may introduce unwanted interaction resulting in additional errors. In one aspect, two qubits are coupled together by a tunable coupler bus (e.g., coupler). Applying a flux pulse drives a two qubit Cphase gate. Stray coupling can create a significant limit on the gate speed attainable with tunable couplers. While large coupling (e.g., as much as 300 MHz) has been used in literature in isolated two qubit experiments, such large coupling may introduce high stray coupling between qubits and unconnected couplers (NNN). Such stray coupling may add coherent errors that are typically only present in multiqubit devices (i.e., more than isolated 2 qubits). Accordingly, large coupling is problematic for large multiqubit devices.

Accordingly, in one aspect, the teachings herein substantially reduce stray coupling to spectator qubits during two qubit gate operation. The stray coupling is discussed in more detail below.

Example Block Diagram

Figure 2:
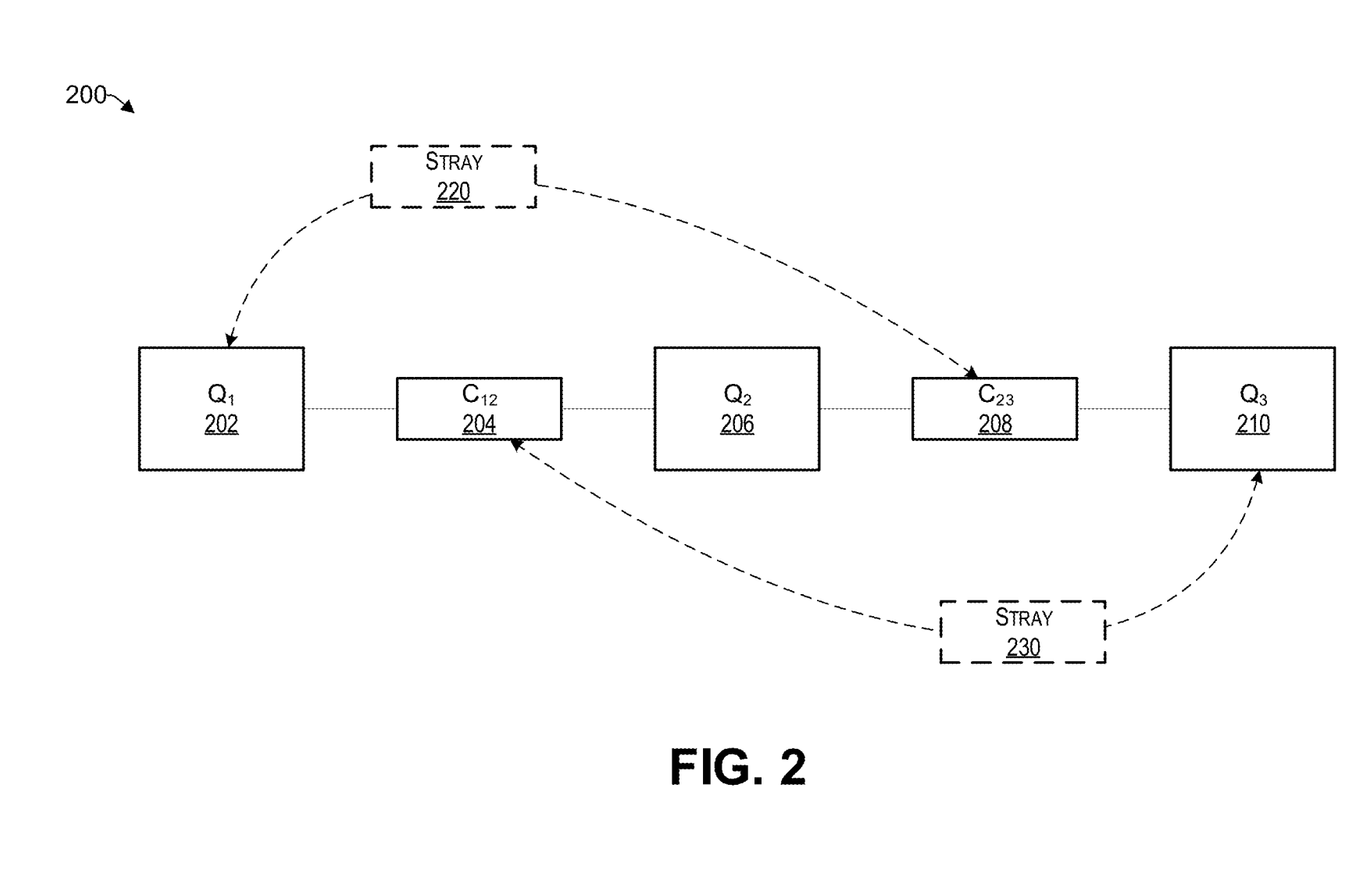
FIG. 2 is a conceptual block diagram of a plurality of qubits connected by couplers, consistent with an illustrative embodiment.

FIG. 2 provides a conceptual block diagram 200 of a plurality of qubits connected by couplers, consistent with an illustrative embodiment. More specifically, FIG. 2 illustrates a first qubit $Q_1$ (202) and a second qubit $Q_2$ (206) being coupled by a first coupler $C_{12}$ (204). There is a third qubit $Q_3$ (210) that is coupled to the second qubit $Q_2$ (206) by way of a second coupler $C_{23}$ (208). In one embodiment, each of the couplers 204 and 208 are flux tunable, sometimes referred to as tunable bus architectures. While only three qubits and two couplers have been illustrated in FIG. 2 to avoid clutter, it will be understood that additional qubits and couplers are supported by the teachings herein.

By way of example, consider a gate being performed between the second qubit $Q_2$ (206) and the third qubit $Q_3$ (210). Ideally, the first coupler $C_{12}$ (204) is in an OFF state, thereby decoupling (e.g., isolating) the first qubit $Q_1$ (202) from the system. In reality, however, there is stray coupling between components. For example, there may be a stray (e.g., capacitive) coupling 220 between the second coupler $C_{23}$ (208) and the first qubit $Q_1$ (202) during the formation of the gate between qubits $Q_3$ (210) and $Q_2$ (206). Similarly, there may be stray coupling 230 between the first coupler $C_{12}$ (204) and the third qubit $Q_3$ (210) during a formation of a gate between the first qubit $Q_1$ (202) and the second qubit $Q_2$ (206).

Accordingly, during the formation of the gate between the second qubit $Q_2$ (206) and the third qubit $Q_3$ (210), the third qubit $Q_3$ (210) is hybridized with the second coupler $C_{23}$ (208). Stray coupling 220 between the second coupler $C_{23}$ (208) and the first qubit $Q_1$ (202) results in a finite interaction with the first qubit (202). Consequently, during the formation of this gate, the third qubit $Q_3$ (210) and the first qubit $Q_1$ (202) can swap excitations. Stated differently, in tunable bus architectures, stray coupling can give rise to undesired rotations with spectator qubits.

Figure 3:
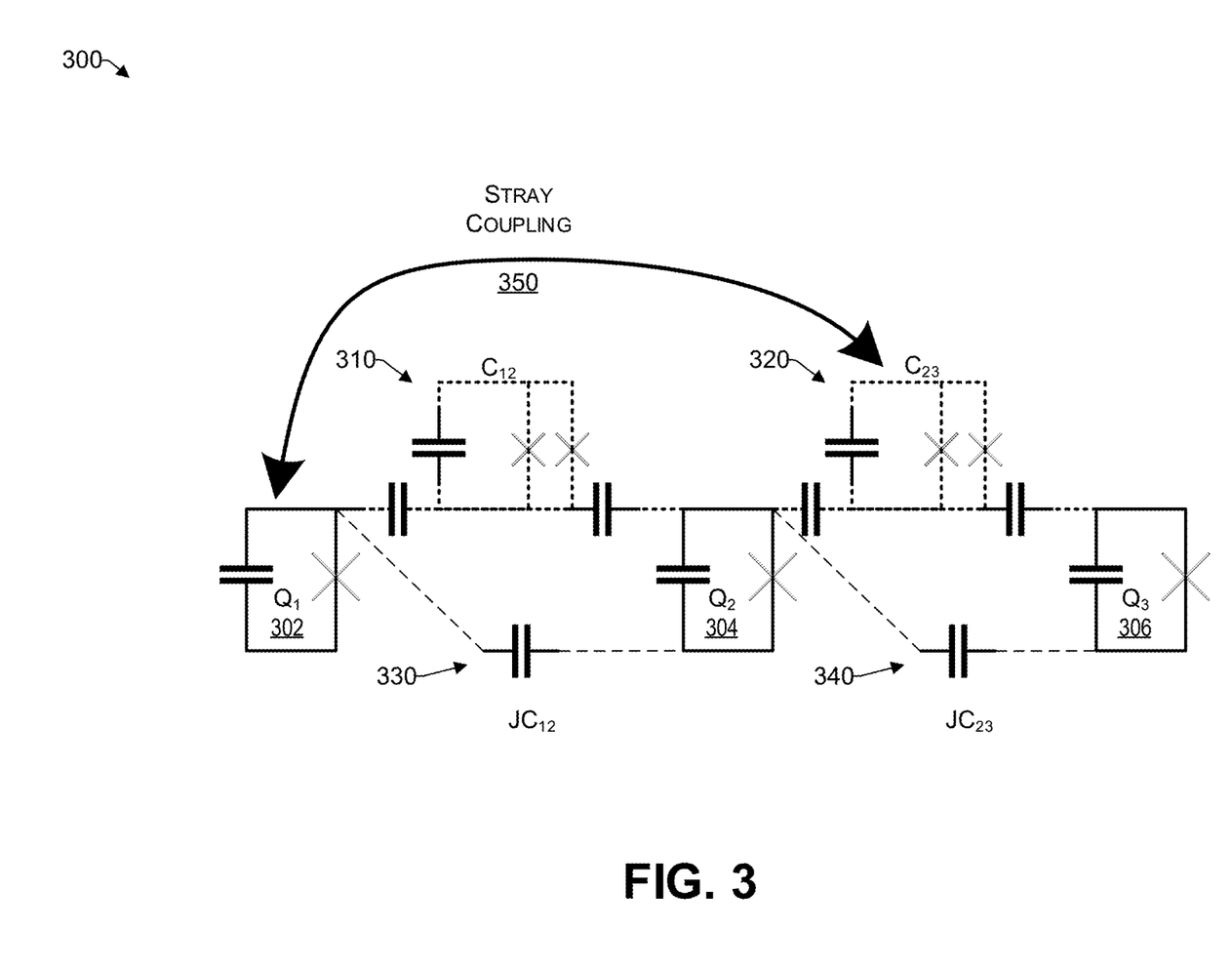
FIG. 3 provides a circuit diagram of a plurality of qubits connected by couplers, consistent with an illustrative embodiment.

Reference now is made to FIG. 3, which provides a circuit diagram 300 of a plurality of qubits connected by couplers, consistent with an illustrative embodiment. FIG. 3 illustrates qubits $Q_1$ (302), $Q_2$ (304), and $Q_3$ (306) being coupled by tunable couplers 310 and 320, respectively. While a preferred type of coupler (310, 320) is illustrated by way of example, it will be understood that other types of tunable couplers are supported by the teachings herein as well.

As discussed in the context of FIG. 2 above, when a gate is created between qubit $Q_3$ (306) and qubit $Q_2$ (304), coupler $C_{23}$ (320) is turned ON while other adjacent couplers (e.g., 310) are kept OFF. When a gate is created between qubits $Q_1$ (302) and $Q_2$ (304), coupler $C_{12}$ (310) is turned ON while coupler 320 is kept OFF. Each coupler (e.g., 310) may have an antecedent coupler (e.g., $JC_{12}$ (330))

that is operative to reduce, e.g., cancel, the coupling effect of the coupler $C_{12}$ (310) between qubits $Q_1$ (302) and $Q_2$ (304). For example, antecedent coupler $JC_{12}$ (330) is tuned such that it has a same magnitude but opposite in sign to the coupling effect of its corresponding coupler 310, such that a coupling between the first qubit and the second qubit $Q_2$ is tuned out. Accordingly, antecedent coupler $JC_{12}$ is specifically introduced to facilitate a true OFF state. Similarly, coupler $JC_{23}$ (340) provides a similar antecedent coupling for coupler 320. Nonetheless, stray coupling (such as 350) between an active (e.g., ON) coupler 320 and a spectator qubit (e.g., $Q_1$ (302)) may result in unreliable performance (e.g., undesired rotation) of the spectator qubit (e.g., $Q_1$ (302)). This stray coupling can be tuned out by a specific timing operation of the couplers $C_{12}$ (310) and $C_{23}$ (320), where the amplitude and the duration of the time when these couplers are ON is controlled in particular ways, discussed in more detail below.

Figure 4:
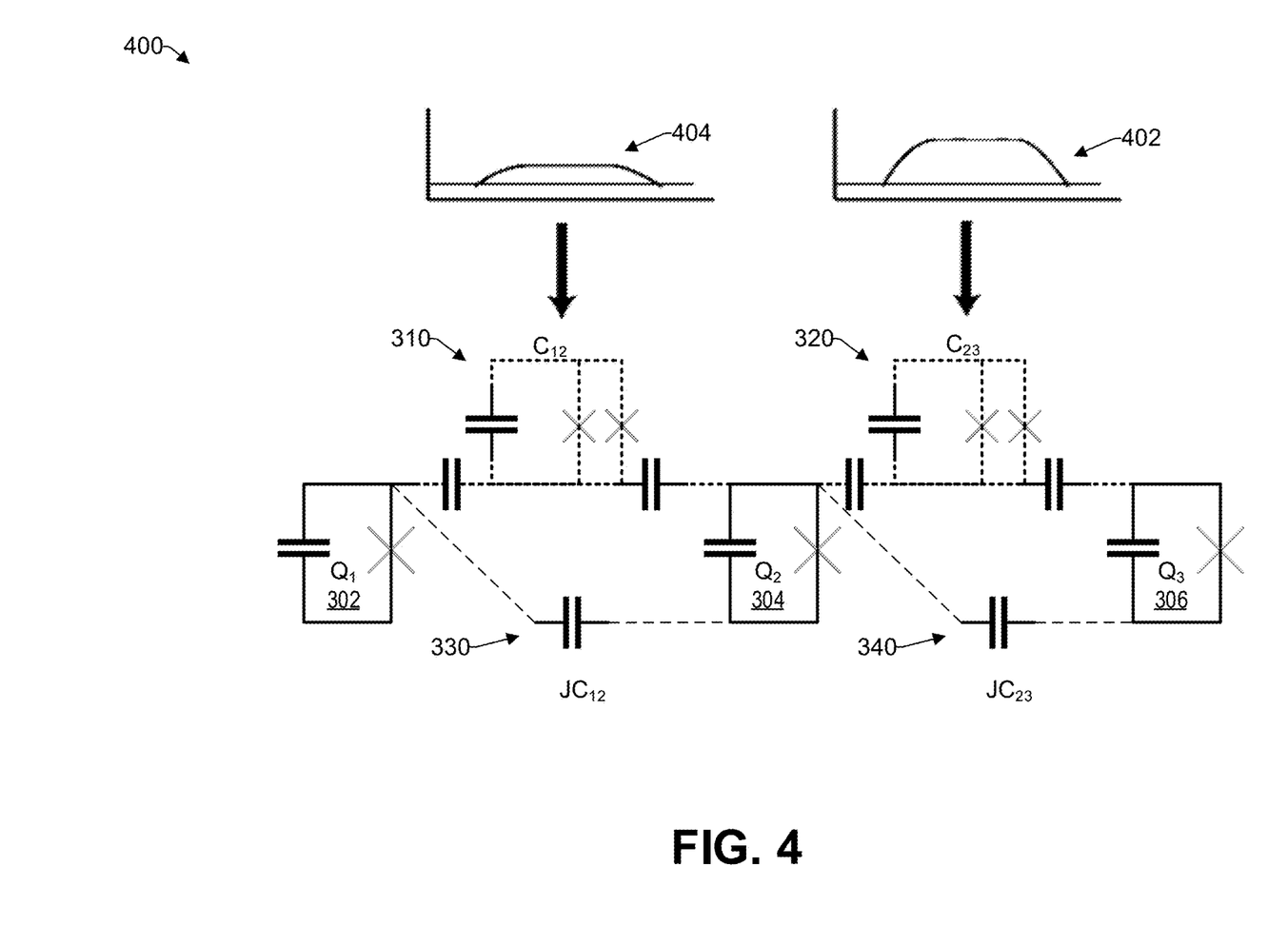
FIG. 4 provides a circuit diagram of a plurality of qubits connected by couplers that are controlled in such a way that stray coupling is mitigated during formation of gates between qubits, consistent with an illustrative embodiment.

Reference now is made to FIG. 4 which provides a circuit diagram of a plurality of qubits connected by couplers that are controlled in such a way that stray coupling is mitigated during formation of gates between qubits, consistent with an illustrative embodiment. The components of FIG. 4 are substantially similar to FIG. 3 and are therefore not explained in detail here for brevity.

By way of example, consider a gate being formed between qubits $Q_3$ (306) and $Q_2$ (304). To that end, a first pulse 402 is sent to the coupler $C_{23}$ (320), thereby turning the coupler $C_{23}$ (320) ON. A second pulse 404, which may have a start time and an end time that is substantially similar to the first pulse 402, is sent to the coupler $C_{12}$ (310), thereby turning ON coupler $C_{12}$ (310). In some embodiments, the amplitude of the pulse 404 is lower than that of pulse 402. Applicants have determined that by initiating a small (e.g., smaller than the interaction between qubits $Q_2$ (304) and $Q_3$ (306)) interaction between qubit $Q_1$ (302) and qubit $Q_2$ (304), the interaction created by the stray coupling 350 is mitigated (e.g., cancelled). Stated differently, stray capacitance between a first coupler (between two dominant qubits) and a spectator qubit during the formation of a gate between the two dominant qubits can be reduced and mitigated by activating (i.e., sending a pulse to) a second coupler $C_{12}$ (310) to initiate a small interaction between the spectator qubit $Q_1$ (302) and another qubit (e.g., $Q_2$ (304)), thereby avoiding adverse interaction with spectator qubits during qubit formation, such as an accidental gate with a spectator qubit.

Example Timing Operation

As mentioned above, in some embodiments, the compensation pulse may be as simple as a scaled (e.g., in amplitude) copy of a pulse that is operative to turn ON a coupler between two dominant qubits. In one embodiment, the scaling is set such that the additional interaction created by the coupler $C_{12}$ (310) is equal in size and opposite in magnitude to the interaction created by action of the coupler $C_{23}$ (320) acting through the stray coupling 350. However, more advanced timing operations are possible. A salient insight is that spectator errors tend to be induced via a tunable coupler with a spectator qubit when qubit frequencies become degenerate. In quantum mechanics, an energy level is degenerate if it corresponds to two or more different measurable states of a quantum system. Conversely, two or more different states of a quantum mechanical system are said to be degenerate if they give the same value of energy upon measurement. It should be noted that turning a coupler ON, can shift the frequencies of the two qubits being coupled. Accordingly, it is possible for qubits that were not degenerate to be degenerate during part of the pulse.

Figure 5:
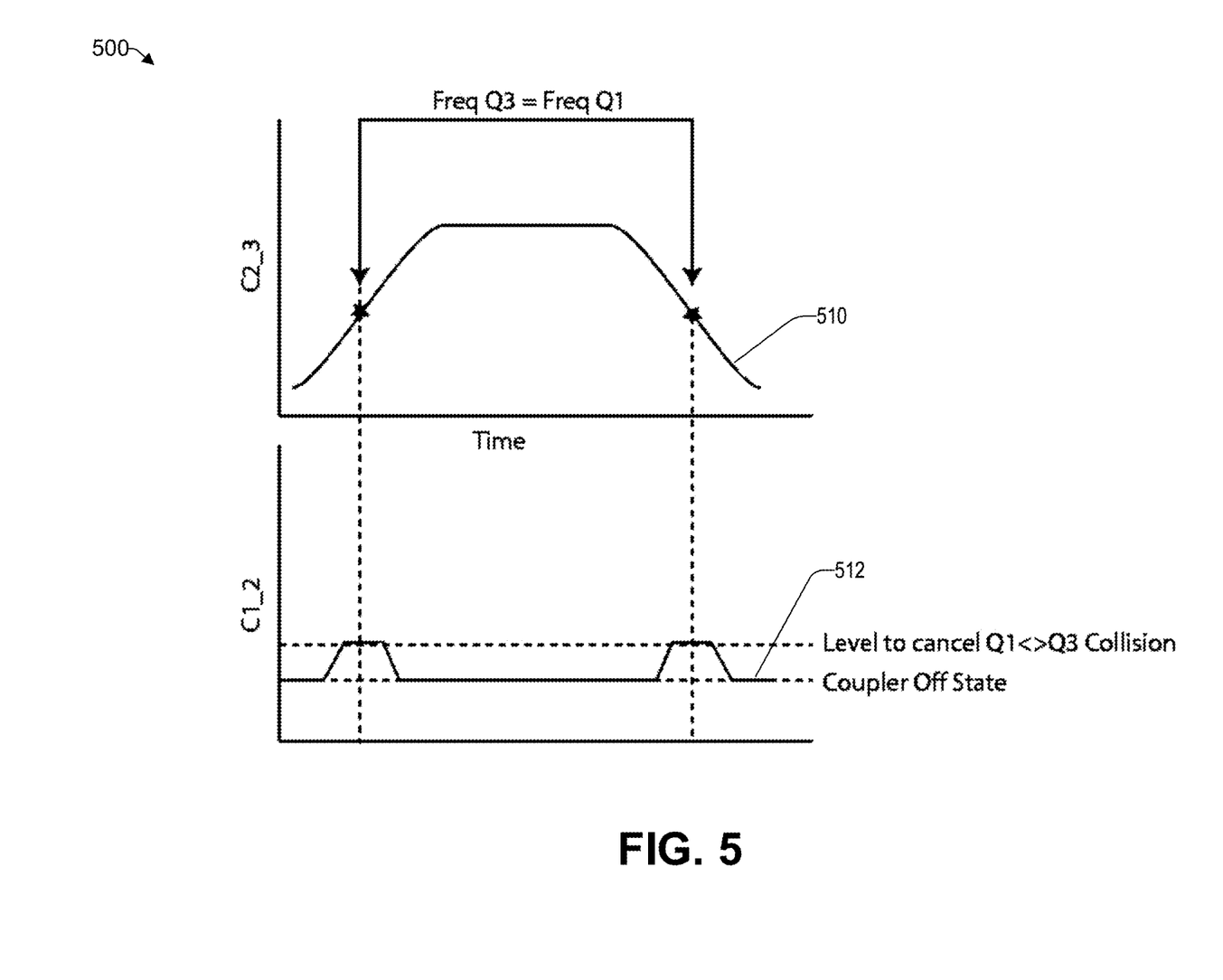
FIG. 5 is an example timing operation to reduce an unwanted coupling between two qubits during a formation of a gate, consistent with an illustrative embodiment.

FIG. 5 is an example timing operation to reduce, e.g., cancel prevent) an unwanted coupling between two qubits during a formation of a gate, consistent with an illustrative embodiment. The waveforms 500 will be discussed in view of the circuit diagram 300 of FIG. 3. For example, when a gate is formed between qubits $Q_3$ (306) and $Q_2$ (304), a pulse (e.g., waveform) 510 is provided to coupler $C_{23}$ (320). During this pulse (waveform) 510 on coupler $C_{23}$ (320), both qubit $Q_2$ and $Q_3$ frequencies will change. At some amplitude, $Q_1$ and $Q_3$ will be degenerate allowing for a swap (e.g., a type of an unwanted gate). For example, the frequency of both qubits $Q_1$ (302) and $Q_3$ (306) will be equal. It is during this phase (i.e., when the frequencies of both qubits being substantially similar) that accidental swaps can occur and spectator qubits are most vulnerable. In this regard, to reduce, e.g., cancel, a collision between qubit $Q_3$ (306) and $Q_1$ (302) facilitated by a stray coupling 350 between qubit $Q_1$ (302) and coupler $C_{23}$ (320), a pulse 512 is applied to coupler $C_{12}$ (310) such that, at the time when the collision occurs, the coupling between qubits $Q_3$ (306) and $Q_1$ (302) is canceled. As illustrated by waveform 512, the waveform applied to the second coupler $C_{12}$ (310) need not be a copy of the waveform applied to qubit $C_{23}$ (320). Rather, in one embodiment, the waveform 512 can be a specially crafted pulse that reaches an appropriate amplitude for reduction, e.g., cancelation, of the stray coupling 350 just during a relevant time. This relevant time is the period when the frequency difference between the dominant qubit $Q_3$ (306) and the spectator qubit $Q_1$ (302) is comparable (e.g., within a predetermined range) to interaction strength created by the stray coupling. When the frequency of the qubit $Q_3$ (306) exits this condition, the coupler $C_{12}$ (310) is turned OFF. A similar operation is performed during the next edge (e.g., falling edge) of the waveform 510. In this way, a more precise (i.e., time targeted) ON and OFF time of the second coupler is provided, which prevents collision between qubits $Q_3$ (306) and $Q_1$ (302), while reducing ZZ (a state dependent qubit interaction that can be used to form a C-phase gate), as compared to waveform 404 in FIG. 4.

The teachings herein are not limited to preventing single collisions. In this regard, reference is made to FIG. 6, which is an example timing operation to reduce, e.g., cancel (prevent), multiple collisions during a formation of a gate, consistent with an illustrative embodiment. The waveforms 600 will be discussed in view of the circuit diagram 300 of FIG. 3. Multiple collisions can occur when there are more than one spectator qubits that could be affected by the stray capacitance introduced during the formation of a gate between two dominant qubits (e.g., $Q_3$ (306) and $Q_2$ (304)). Typically, such collisions can occur in different manifolds, namely, with only qubit $Q_3$ (306) or qubit $Q_1$ (302) in excited state (i.e., 1 photon manifold) vs. with qubits $Q_2$ (304) and $Q_3$ (306) excited (i.e., 2 photon manifold).

Figure 6:
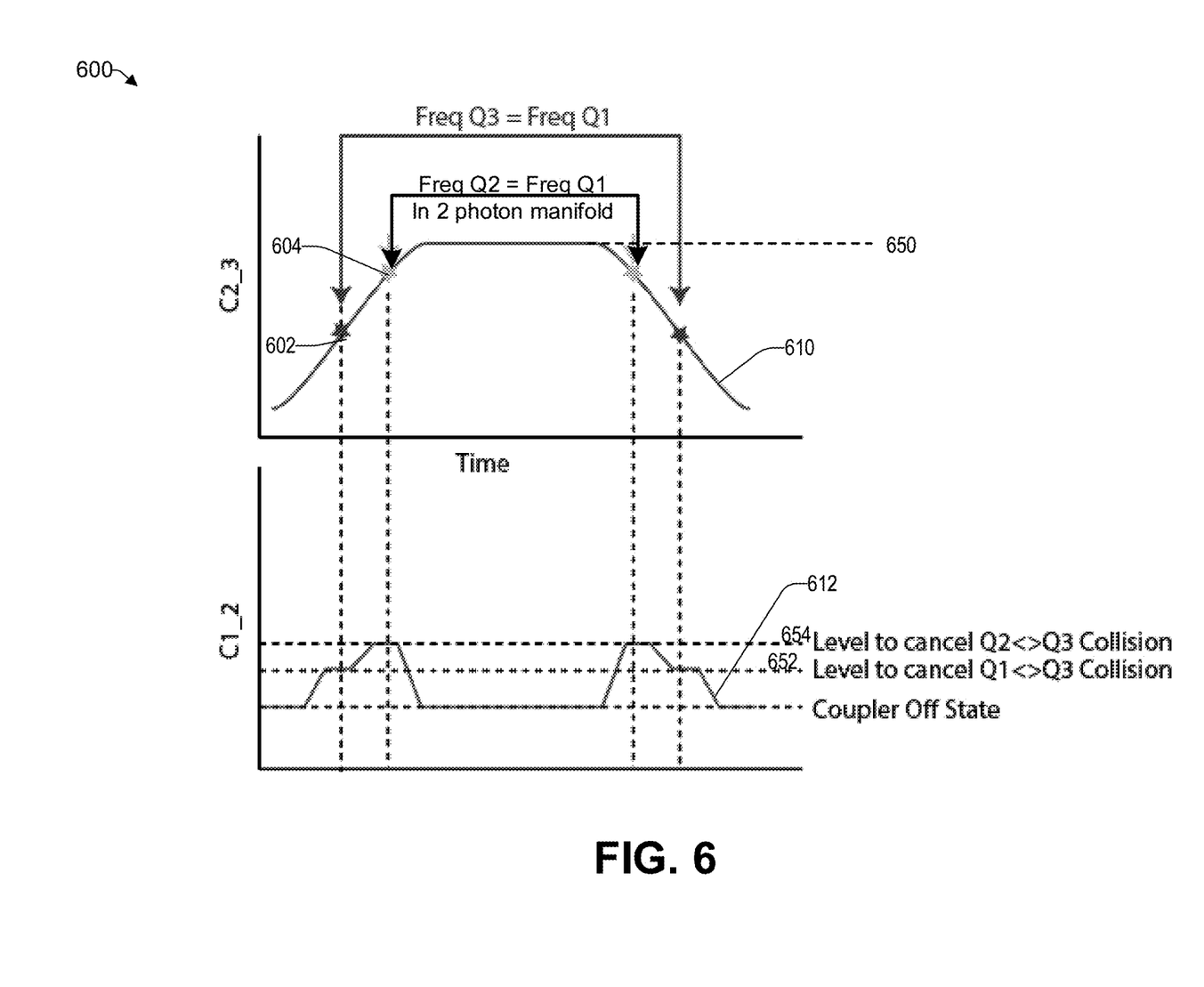
FIG. 6 is an example timing operation to reduce multiple collisions during a formation of a gate, consistent with an illustrative embodiment.

Different collisions can have different reduction, e.g., cancelation, conditions. However, different collisions are also encountered at different amplitudes of the $C_{23}$ (320) coupler. As a result, a cancellation waveform can be created that accommodates more than one collision during the formation of a gate. For example, when a gate is formed between qubits $Q_3$ (306) and $Q_2$ (304), a pulse (e.g., waveform) 610 is provided to coupler $C_{23}$ (320) having a first amplitude 650. During this pulse (waveform) 610 on coupler $C_{23}$ (320), both qubit $Q_2$ (304) and $Q_3$ (306) frequencies will change. At some amplitude, $Q_1$ and $Q_3$ will be degenerate allowing for a swap (e.g., accidental gate). At time 602, the frequency of both qubits $Q_1$ (302) and $Q_3$ (306) will be equal. To reduce, e.g., cancel a collision between qubit $Q_3$ (306) and $Q_1$ (302) facilitated by a stray coupling 350 between qubit $Q_1$ (302) and coupler $C_{23}$ (320), a pulse 612 having a second amplitude 652. Accordingly, at the time that the collision occurs between the qubits $Q_1$ (302) and $Q_3$ (306), the coupling between the same is cancelled. However, at time 604, there is a collision between the qubits $Q_2$ (304) and $Q_1$ (302). In this regard, to cancel a collision between qubits $Q_2$ (304) and $Q_1$ (302) facilitated by a stray coupling between qubit $Q_1$ (302) and coupler $C_{12}$ (310), a pulse 612 having a third amplitude 654. A similar operation is performed during the next edge (e.g., falling edge) of the waveform 610.

Example Calibration of Compensation Waveform

Figure 7:
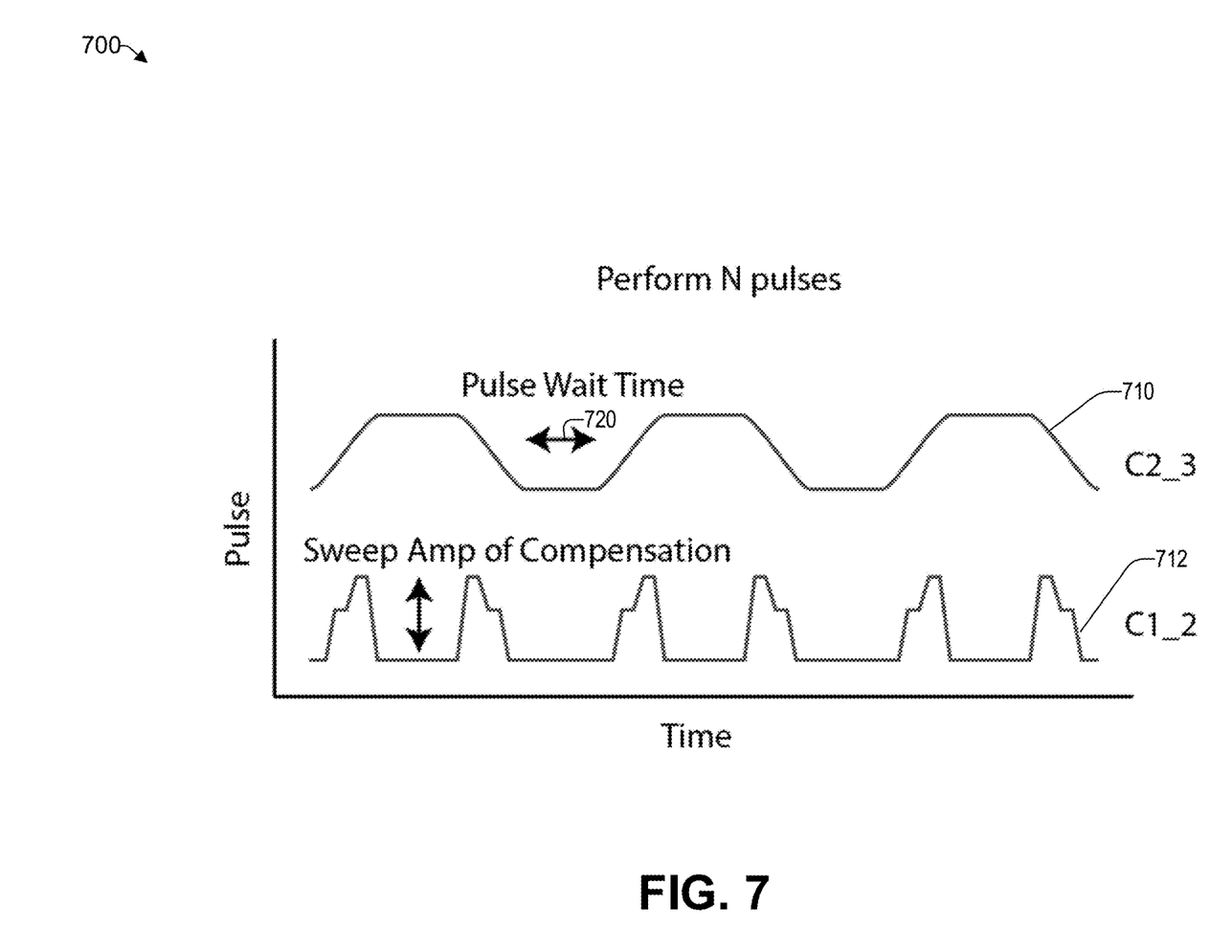
FIG. 7 is an example timing diagram that facilitates calibration of waveform parameters to minimize leakage during the formation of a gate, consistent with an illustrative embodiment.

Accordingly, the shape of the compensation waveform can prevent undesired rotations in spectator qubits during the formation of a gate between dominant qubits. FIG. 7 is an example timing diagram 700 that facilitates calibration of waveform parameters to minimize leakage during the formation of a gate, consistent with an illustrative embodiment. The waveforms 710 and 712 will be discussed in view of the circuit diagram 300 of FIG. 3.

Waveform 710 represents the activation cycle of the coupler $C_{23}$ (320) to facilitate the creation of a gate between qubits $Q_2$ (304) and $Q_3$ (306). A series of N pulses is applied on the coupler $C_{23}$ (320) along with a compensation waveform to the coupler $C_{12}$ (310) to compensate for the stray coupling 350 between the spectator qubit $Q_1$ (302) and the coupler $C_{23}$ (320). The compensation waveform 712 applied to the second coupler $C_{12}$ (310) between the spectator qubit $Q_1$ (302) and the second qubit $Q_2$ (304) is varied in at least one of amplitude or pulse width in each cycle to determine at least one of: (i) a time to initiate the pulse (e.g., positive ramp), (ii) a pulse width (e.g., when to initiate a negative ramp), and (iii) an amplitude of the pulse of the compensation waveform 712. These parameters are optimized to minimize any swapping of excitations between relevant qubits (e.g., $Q_3$ (306) and $Q_1$ (302)). For example, the measurement & control unit 130 may adjust a parameter for each pulse and measure an amount of leakage (e.g., how it affects a spectator qubit) and create a plot thereof. The point that provides a minimum amount of leakage is selected for that particular parameter. Other parameters may be adjusted similarly until all parameters are adequately adjusted to provide an appropriate initiation time, pulse width, and/or amplitude for the compensation signal 712.

In one embodiment, a pulse wait time 720 is adjusted between the pulses of waveform 710 to improve contrast. The wait time between pulses changes the contrast. For example, between pulses of the waveform 710, there is a frequency difference between swapped and non-swapped states. This frequency difference results in a phase difference that can lead to either constructive (higher contrast) or destructive (lower contrast) interference between successive pulses. In this regard, in one embodiment, the measurement and control unit 130 may perform a sweep of the wait time 720 to identify a wait time 720 that provides a constructive interference between pulses, thereby leading to higher contrast.

Figure 8:
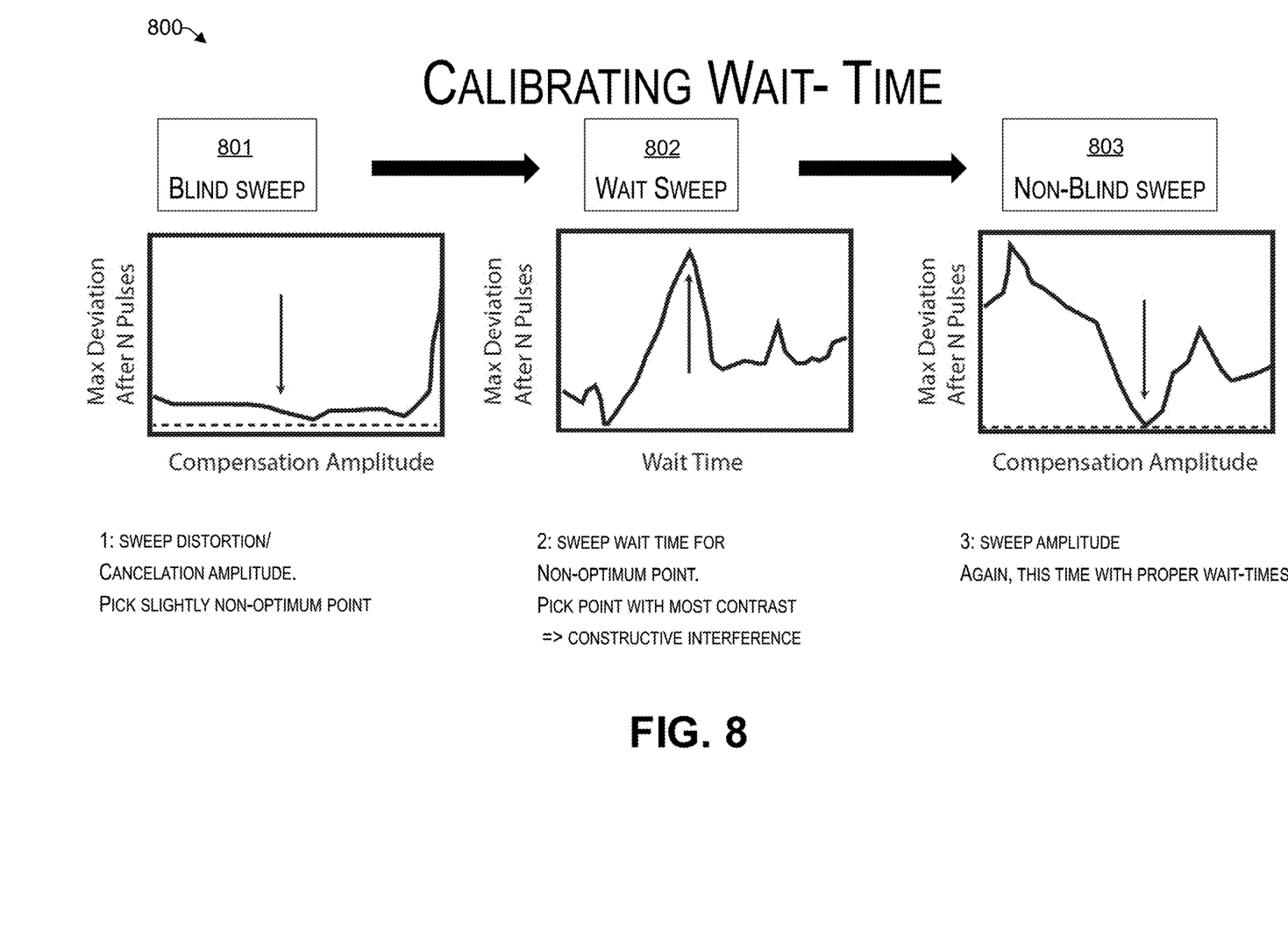
FIG. 8 is a conceptual block diagram of complete calibration of the reduction, e.g., cancellation, waveform, consistent with an illustrative embodiment.

FIG. 8 is a conceptual block diagram 800 of complete calibration of the reduction, e.g., cancelation waveform, consistent with an illustrative embodiment. The block diagram 800 will be discussed with reference to FIG. 1.

At block 801, a blind sweep is performed by the measurement and control unit 130. For example, a reduction, e.g., cancelation, amplitude is swept. This sweep is "blind" in the sense that a proper wait time has not yet been determined. Consequently, the measurement contrast can be poor (e.g., not optimized). In this regard, at block 802 a wait sweep is performed. For example, with the reduction, e.g., cancelation, amplitude chosen to be close to optimal in block 801, wait time (720) is swept. A point with the most contrast is selected, thereby providing constructive interference. At block 803, a non-blind sweep is performed for the parameters of the second coupler (e.g., coupled to the spectator qubit), where the wait time from the wait sweep 802 is used. The optimization of wait time provides enhanced contrast and thus allows to find an optimum cancelation amplitude in the presence of noise. In one embodiment, the role of the wait time can be substituted with Z rotations on one or both of the qubits involved.

Example Process

Figure 9:
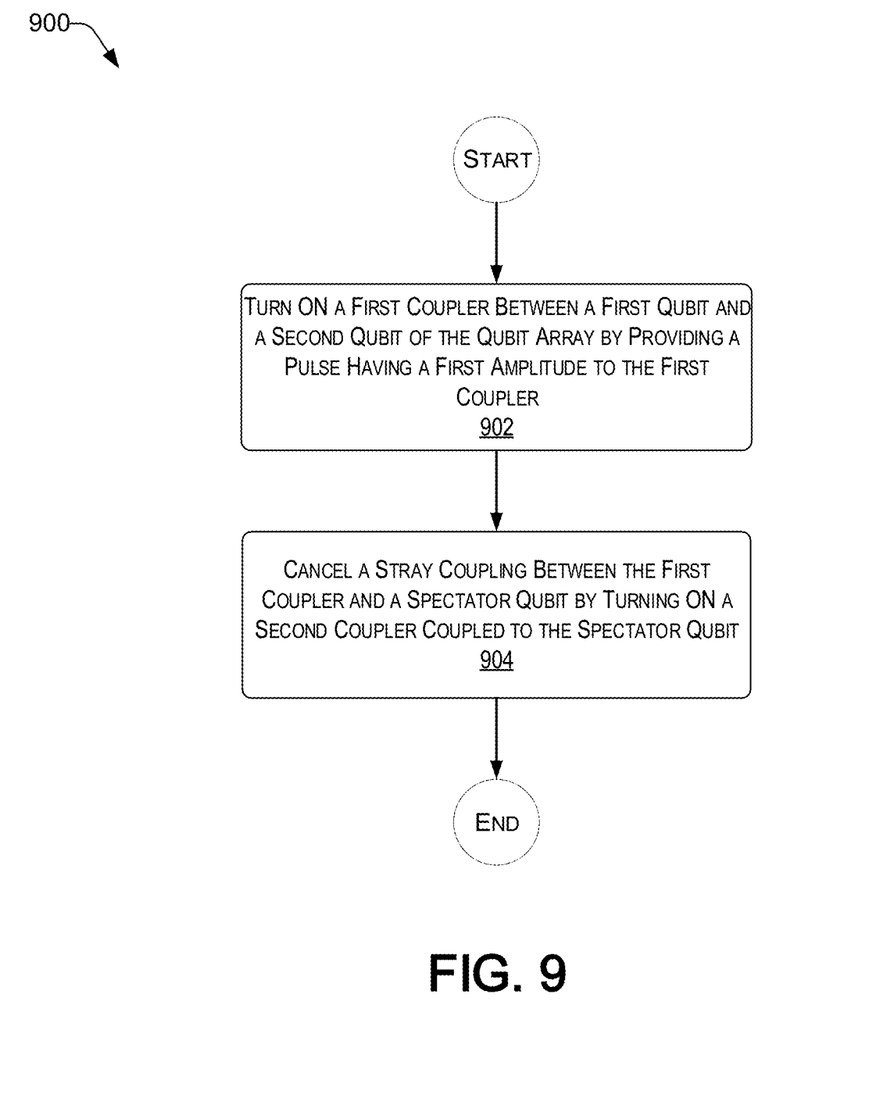
FIG. 9 is an illustrative process related to mitigating stray coupling with a spectator qubit during the formation of a gate.

With the foregoing overview of the example architectures, it may be helpful now to consider a high-level discussion of an example process. To that end, FIG. 9 presents an illustrative process related to mitigating stray coupling with a spectator qubit during the formation of a gate. Processes 900 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. In various embodiments, the process may be controlled in a cryogenic environment or at room temperature by a measurement and control unit 130 of FIG. 1. For discussion purposes, the process is described with reference to the architecture of FIG. 3.

At block 902, a qubit cross-talk mitigation engine, which may be part of the measurement and control unit 130, turns ON a first coupler $C_{23}$ (320) between a first qubit $Q_3$ (306) and second qubit $Q_2$ (304) of the qubit array by providing a pulse having a first amplitude to the first coupler $C_{23}$ (320). Turning ON the first coupler first coupler $C_{23}$ (320) between the first qubit $Q_3$ (306) and second qubit $Q_2$ (304) creates a gate between them.

At bock 904, a stray coupling between the first coupler $C_{23}$ (320) and a spectator qubit $Q_1$ (302) is reduced, e.g., cancelled, by turning ON a second coupler $C_{12}$ (302) coupled to the spectator qubit $Q_1$ (302), by providing a compensation pulse having a second amplitude, to the second coupler second coupler $C_{12}$ (302), based on (a timing of) the first pulse. As explained in the context of the discussion of FIGS. 4 to 7, the timing of the compensation pulse is based on the timing of the first pulse. In various embodiments, the compensation pulse may be a simple clone of the first pulse at an appropriate amplitude, or may have a different shape to further reduce noise and/or to accommodate any additional collisions with spectator qubits. The first and second couplers are flux tunable. The reduction, e.g., cancellation, of the stray coupling 350 between the first coupler $C_{23}$ (320) and the spectator qubit $Q_1$ (302) is operative to prevent an accidental gate between these qubits.

Example Computer Platform

Figure 10:
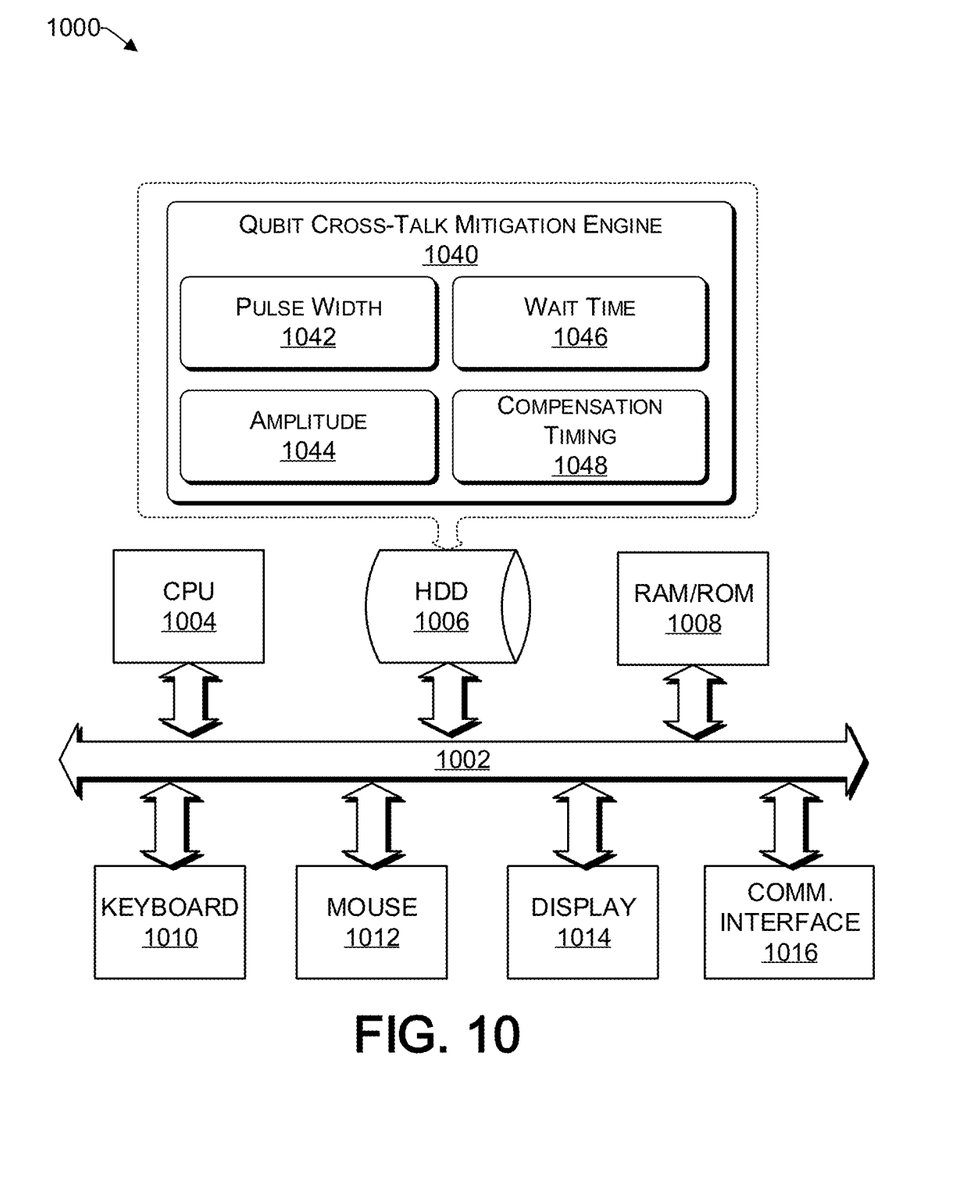
FIG. 10 provides a functional block diagram illustration of a computer hardware platform that can be used to implement a particularly configured computing device that can host a qubit cross-talk mitigation engine.

As discussed above, functions relating to interacting with qubits by way of measurement and control signals may include a measurement and control unit, as shown in FIG. 1. FIG. 10 provides a functional block diagram illustration of a computer hardware platform 1000 that can be used to implement a particularly configured computing device that can host a qubit cross-talk mitigation engine 1040 operative to perform the functions discussed herein. In particular, FIG. 10 illustrates a network or host computer platform 1000, as may be used to implement an appropriately configured computing device, such as the measurement and control block 130 of FIG. 1.

The computer platform 1000 may include a central processing unit (CPU) 1004, a hard disk drive (HDD) 1006, random access memory (RAM) and/or read only memory (ROM) 1008, a keyboard 1010, a mouse 1012, a display 1014, and a communication interface 1016, which are connected to a system bus 1002.

In one embodiment, the HDD 1006, has capabilities that include storing a program that can execute various processes, such as the qubit cross-talk mitigation engine 1040, in a manner described herein. The qubit cross-talk mitigation engine 1040 may have various modules configured to perform different functions. For example, there may be a pulse width module 1042 operative to determine a start and stop time of a compensation pulse that mitigates stray coupling, based on a timing of a pulse applied to a coupler used in creating a gate between two qubits. There may be an amplitude module 1044 operative to provide an appropriate amplitude of the compensation signal based on a collision time between a dominant qubit and a spectator qubit as described herein. There may be a wait time module 1046 operative to adjust a wait time between pulses applied to couplers during formation of gates, such that an appropriate contrast is achieved between pulses. There may be a compensation timing module 1048 operative to determine a start and stop time of a compensation pulse that mitigates stray coupling, based on when collisions occur between dominant qubits and spectator qubits.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of reducing stray coupling in a qubit array, comprising:
   turning ON a first coupler between a first qubit and second qubit of the qubit array by providing a pulse having a first amplitude, to the first coupler;
   reducing a stray coupling between the first coupler and a spectator qubit by turning ON a second coupler coupled to the spectator qubit, by providing a compensation pulse having a second amplitude, to the second coupler, based on the pulse having the first amplitude.

2. The method of claim 1, wherein each of the first and second couplers is flux tunable.

3. The method of claim 1, wherein turning ON the first coupler between the first qubit and the second qubit creates a gate between the first qubit and the second qubit.

4. The method of claim 3, wherein the reduction of the stray coupling between the first coupler and the spectator qubit is operative to prevent an accidental gate between the first qubit and the spectator qubit.

5. The method of claim 1, wherein a width of the compensation pulse is substantially similar to a width of the pulse that is used to turn ON the first coupler.

6. The method of claim 5, wherein an amplitude of the compensation pulse is lower than an amplitude of the pulse that is used to turn ON the first coupler.

7. The method of claim 1, wherein the second coupler is turned ON by the compensation pulse when a frequency of the first qubit is substantially similar to a frequency of the spectator qubit, during a first edge of the pulse used to turn ON the first coupler.

8. The method of claim 7, wherein the second coupler is turned OFF by the compensation pulse when the frequency of the first qubit is substantially similar to the frequency of the spectator qubit, during a second edge of the pulse used to turn OFF the first coupler.

9. The method of claim 8, wherein the second coupler is turned OFF by the compensation pulse when the frequency of the first qubit is not substantially similar to the frequency of the spectator qubit, during the first edge of the pulse used to turn ON the first coupler.

10. The method of claim 9, wherein the second coupler is turned ON by the compensation pulse when the frequency of the first qubit is substantially similar to the frequency of the spectator qubit, during the second edge of the pulse used to turn OFF the first coupler.

11. The method of claim 9, further comprising, preventing a collision between the second qubit and the spectator qubit by turning or keeping ON the second coupler by the compensation pulse when a frequency of the second qubit is substantially similar to the frequency of the spectator qubit.

12. The method of claim 11, wherein an amplitude of the compensation pulse, when the frequency of the first qubit is substantially similar to the frequency of the spectator qubit, is different from an amplitude of the compensation pulse when the frequency of the second qubit is substantially similar to the frequency of the spectator qubit.

13. The method of claim 1, further comprising determining an amplitude of the compensation pulse by, during a setup phase:
    applying a series of N pulses to the first coupler;
    for each of the N pulses, sweeping an amplitude of the compensation signal; and
    selecting an amplitude of the compensation signal that provides a least amount of stray coupling between the first coupler and the spectator qubit.

14. The method of claim 1, further comprising adjusting a wait time or Z rotation between each of the N pulses based on a highest constructive interference between two compensation pulses.

15. A computing device comprising:
    a processor;
    a storage device coupled to the processor;
    an engine stored in the storage device, wherein an execution of the engine by the processor configures the computing device to perform acts, comprising:
    turning ON a first coupler between a first qubit and second qubit of a qubit array by providing a pulse having a first amplitude to the first coupler;
    reducing a stray coupling between the first coupler and a spectator qubit by turning ON a second coupler coupled to the spectator qubit, by providing a compensation pulse having a second amplitude, to the second coupler, based on the pulse having the first amplitude.

16. The computing device of claim 15, wherein:

the turning ON of the first coupler between the first qubit and the second qubit creates a gate between the first qubit and the second qubit; and the reduction of the stray coupling between the first coupler and the spectator qubit is operative to prevent an accidental gate between the first qubit and the spectator qubit.

17. The computing device of claim 15, wherein:

a width of the compensation pulse is substantially similar to a width of the pulse that is used to turn ON the first coupler; and an amplitude of the compensation pulse is lower than an amplitude of the pulse that is used to turn ON the first coupler.

18. The computing device of claim 15, wherein:

the second coupler is turned ON by the compensation pulse when a frequency of the first qubit is substantially similar to a frequency of the spectator qubit, during a first edge of the pulse used to turn ON the first coupler; and the second coupler is turned OFF by the compensation pulse when the frequency of the first qubit is substantially similar to the frequency of the spectator qubit, during a second edge of the pulse used to turn OFF the first coupler.

19. The computing device of claim 18, wherein:

the second coupler is turned OFF by the compensation pulse when the frequency of the first qubit is not substantially similar to the frequency of the spectator qubit, during the first edge of the pulse used to turn ON the first coupler; and the second coupler is turned ON by the compensation pulse when the frequency of the first qubit is substantially similar to the frequency of the spectator qubit, during the second edge of the pulse used to turn OFF the first coupler.

20. The computing device of claim 19, wherein the execution of the engine by the processor further configures the computing device to perform acts comprising preventing a collision between the second qubit and the spectator qubit by turning or keeping ON the second coupler, by the compensation pulse, when a frequency of the second qubit is substantially similar to the frequency of the spectator qubit.

\* \* \* \* \*